United States Patent
Nakatake

(10) Patent No.: US 11,593,785 B2
(45) Date of Patent: Feb. 28, 2023

(54) SETTLEMENT APPARATUS AND SETTLEMENT METHOD INFORMING SYSTEM

(71) Applicant: TOSHIBA TEC KABUSHIKI KAISHA, Tokyo (JP)

(72) Inventor: Shinji Nakatake, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 28 days.

(21) Appl. No.: 17/153,672

(22) Filed: Jan. 20, 2021

(65) Prior Publication Data

US 2021/0304179 A1 Sep. 30, 2021

(30) Foreign Application Priority Data

Mar. 24, 2020 (JP) .............................. JP2020-053067

(51) Int. Cl.
*G06Q 20/22* (2012.01)
*G06Q 20/20* (2012.01)

(52) U.S. Cl.
CPC ........... *G06Q 20/227* (2013.01); *G06Q 20/20* (2013.01)

(58) Field of Classification Search
CPC .... G06Q 20/227; G06Q 20/20; G06Q 20/202; G06Q 20/18; G07G 1/0009; G07G 1/01; G07G 1/12; G07G 3/00; G07G 5/00; G07G 1/0036; G07G 1/06
USPC .......................................................... 705/16
See application file for complete search history.

(56) References Cited

U.S. PATENT DOCUMENTS

| | | | |
|---|---|---|---|
| 6,324,525 B1 * | 11/2001 | Kramer | G06Q 20/102 705/40 |
| 2017/0017941 A1 * | 1/2017 | Takahashi | G07G 1/12 |
| 2017/0132602 A1 | 5/2017 | Susaki et al. | |
| 2017/0186010 A1 | 6/2017 | Gotanda et al. | |

(Continued)

FOREIGN PATENT DOCUMENTS

| | | |
|---|---|---|
| CN | 104574074 A | 4/2015 |
| CN | 107038821 A | 8/2017 |

(Continued)

OTHER PUBLICATIONS

Extended European Search Report dated Aug. 9, 2021, mailed in counterpart European Application No. 21158841.3, 7 pages.

(Continued)

*Primary Examiner* — Garcia Ade
(74) *Attorney, Agent, or Firm* — Kim & Stewart LLP

(57) ABSTRACT

According to one or more embodiments, a settlement apparatus includes a processor. The processor detects a state of the settlement apparatus related to execution of settlement processing at the settlement apparatus using a plurality of settlement methods. The processor determines, based on the detected state of the settlement apparatus, whether there is a first settlement method among the plurality of settlement methods which cannot be executed at the settlement processing apparatus. The processor then notifies a customer of settlement method information indicating the first settlement method cannot be executed at the settlement processing or that another settlement method, other than the first settlement method, can be executed at the settlement apparatus instead of the first settlement method.

14 Claims, 8 Drawing Sheets

(56) References Cited

U.S. PATENT DOCUMENTS

| | | | |
|---|---|---|---|
| 2017/0228716 A1 | 8/2017 | Sugita | |
| 2018/0144319 A1 | 5/2018 | Gotanda et al. | |
| 2018/0336384 A1* | 11/2018 | Maezawa | G07G 1/0009 |
| 2019/0026715 A1 | 1/2019 | Furuya | |
| 2019/0272713 A1* | 9/2019 | Iizaka | G07G 1/0045 |
| 2019/0354980 A1* | 11/2019 | Li | G06Q 20/3672 |
| 2022/0172218 A1* | 6/2022 | Nakahira | G07C 9/10 |

FOREIGN PATENT DOCUMENTS

| | | |
|---|---|---|
| CN | 107067589 A | 8/2017 |
| CN | 108091087 A | 5/2018 |
| CN | 109285301 A | 1/2019 |

OTHER PUBLICATIONS

Chinese Office Action dated Aug. 3, 2022, mailed in counterpart Chinese Application No. 202110030512.2, 22 pages (with translation).

\* cited by examiner

FIG. 3

| DETECTION SIGNAL | SETTLEMENT METHOD |
|---|---|
| A | CASH |
| B | CREDIT |
| C | ELECTRONIC MONEY |

FIG. 4

| FAILURE SITUATION | DISPLAY FORMAT |
|---|---|
| FAILURE IS ABSENT | FIRST FORMAT |
| FAILURE IS PRESENT | SECOND FORMAT |

FIG. 5

| COMMODITY NAME | NUMBER OF ITEMS | UNIT PRICE |
|---|---|---|
| ○○○○ | ☐ | ×× |
| ○○○○ | ☐ | ×× |
| ○○○○ | ☐ | ×× |

TOTAL AMOUNT  ××××

CASH SETTLEMENT NOT ALLOWED

| COMMODITY NAME | NUMBER OF ITEMS | UNIT PRICE |
|---|---|---|
| ○○○○ | ☐ | ×× |
| ○○○○ | ☐ | ×× |
| ○○○○ | ☐ | ×× |

TOTAL AMOUNT  ××××

| REGISTER NUMBER | USABLE |
|---|---|
| 1 | CASH,CREDIT,ELECTRONIC MONEY |
| 2 | CASH,CREDIT,ELECTRONIC MONEY |
| 3 | CREDIT,ELECTRONIC MONEY |
| ... | ... |

SETTLEMENT APPARATUS AND SETTLEMENT METHOD INFORMING SYSTEM

CROSS-REFERENCE TO RELATED APPLICATION

This application is based upon and claims the benefit of priority from Japanese Patent Application No. 2020-053067, filed Mar. 24, 2020, the entire contents of which are incorporated herein by reference.

FIELD

Embodiments described herein relate generally to a settlement apparatus and a settlement method informing system.

BACKGROUND

Some Point-Of-Sales (POS) terminals in a store such as a retail store or the like are capable of performing settlement (or payment) processing by a plurality of settlement methods including cashless settlement. For example, in order to enable not only settlement by cash but also settlement by cashless means such as a credit card and an electronic money, a POS terminal has a cashless settlement terminal connected thereto or incorporated therein.

In such a POS terminal, there may be a time when cash settlement cannot be performed due to, for example, a failure in a conveying mechanism for bills and coins in a change machine that receives cash from, and dispenses change to, a customer or the like. In another instance, if coins stocked in the change machine runs out, a change shortage occurs and the cash settlement processing may need to be prohibited.

There may also be a time when cashless settlement cannot be performed, for example, if a failure occurs in a communication network between the cashless settlement terminal and a server of a credit company or an electronic money management company.

Even if such failures occur and settlement processing cannot be executed by one of the settlement methods, however, so long as the POS terminal can accept other settlement methods than the unavailable method, the settlement processing can be continued even before the failures or problems are solved by a maintenance person, a store clerk, or the like. This can improve operation efficiency of the POS terminal functioning as a settlement apparatus.

From a view point of a customer who is about to make settlement or payment at a store, in a case where a plurality of POS terminals are arranged in register counters or in a checkout area of the store, it is like that a customer want to know what kind of a failure has occurred in which POS terminal so that he or she can use another executable settlement method or move to another available POS terminal, thereby avoiding such an inconvenient instance that a customer desiring cash settlement stands in a line of a POS terminal that cannot perform cash settlement.

Hence, there is a need for a settlement apparatus and a settlement method informing system capable of handling a plurality of settlement methods and informing a customer of executability or acceptability of each of the settlement methods.

DESCRIPTION OF THE DRAWINGS

FIG. 3 depicts an example data configuration of a settlement method file according to a first embodiment.

FIG. 4 depicts an example data configuration of a display format file according to a first embodiment.

FIG. 5 depicts an example display screen of a customer display according to a first embodiment.

FIG. 6 depicts an example display screen of a customer display according to a first embodiment.

DETAILED DESCRIPTION

According to one or more embodiments, a settlement apparatus includes a processor. The processor is configured to detect a state of the settlement apparatus related to execution of settlement processing using a plurality of settlement methods. The processor then determines, based on the detected state, whether there is a first settlement method among the plurality of settlement methods that cannot be executed at the settlement apparatus. The processor is configured to provide settlement method information for informing a customer that the first settlement method cannot be executed at the settlement processing apparatus or that another settlement method in the plurality of settlement methods can be executed at the settlement processing apparatus instead of the first settlement method.

First Embodiment

Figure 1:
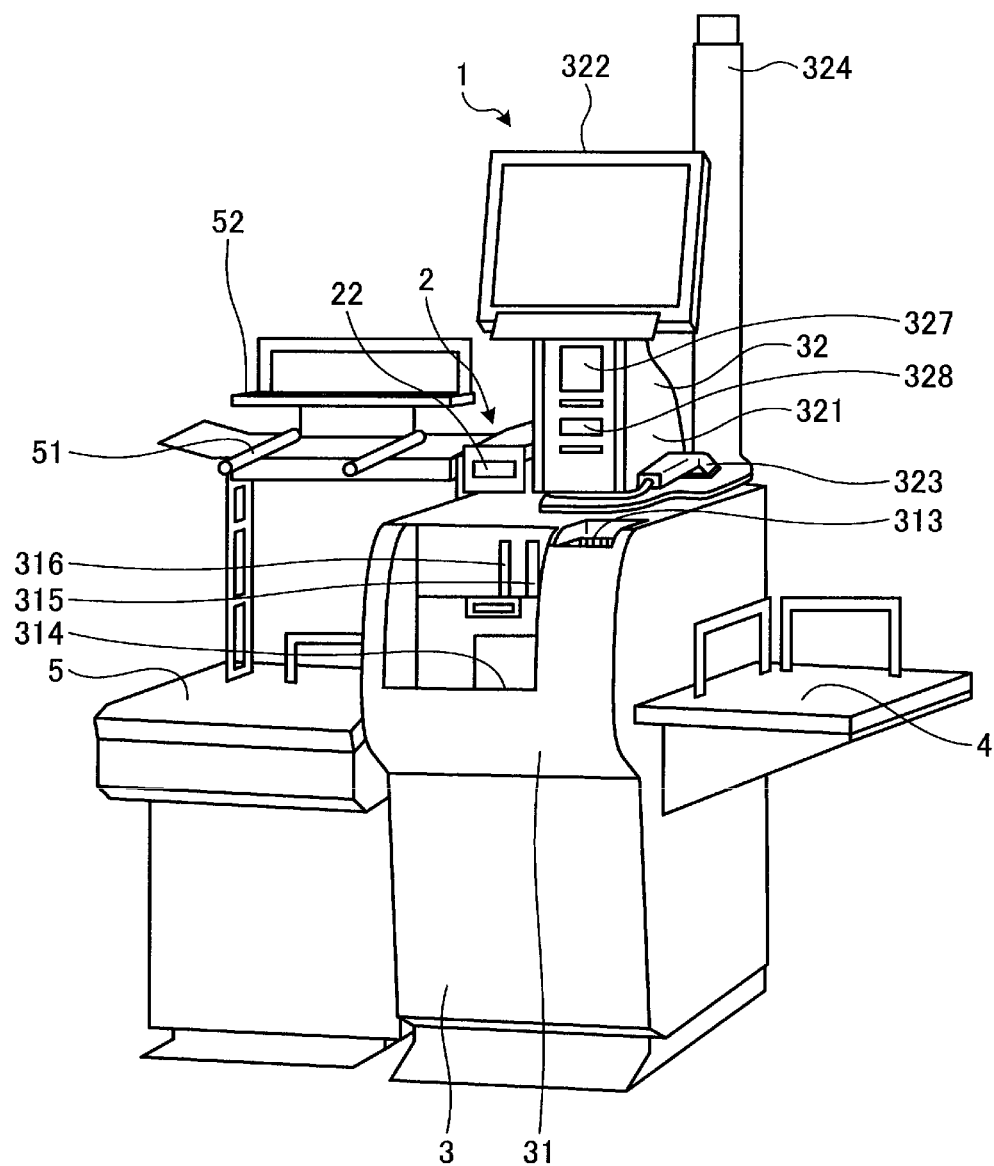
FIG. 1 depicts a POS terminal and a settlement terminal according to a first embodiment.

A first embodiment will be described with reference to FIGS. 1 to 6. FIG. 1 depicts a self-service POS terminal 1 and a cashless settlement terminal 2 according to the first embodiment. The POS terminal 1 is an example of a settlement apparatus. The POS terminal 1 includes a main body unit 3, a first loading table 4, and a second loading table 5. They are located on the front center part, the front right-side part, and the front left-side part of the POS terminal 1, respectively.

The main body unit 3 includes a depositing and dispensing unit 31 and a sales-data processing unit 32. The depositing and dispensing unit 31 accommodates a change machine 311 (see FIG. 2) therein. When a customer pays a purchase price of commodities by cash, the change machine 311 receives bills and coins from the customer and dispenses change as needed. The change machine 311 includes a change machine sensor 312 (see FIG. 2). The change machine sensor 312 includes a first detecting unit that detects a failure or a malfunction of a part, a unit, or the like of the change machine 311, such as a conveying mechanism for bills and coins (herein may also be referred to as a cash conveying mechanism), and a second detecting unit that detects a change shortage. For example, if dispensing of change is not performed at least for a predetermined time after a control unit 100 (FIG. 2) instructs the dispensing of change, the first detecting unit outputs a detection signal A (FIG. 3). At the same time, the first detecting unit outputs information related to a failure occurred in the change machine 311, for example in the cash conveying mechanism. If the numbers of stocked bills and coins fall below predetermined values, the second detecting unit outputs information indicating the change shortage, together with the detection signal A.

The depositing and dispensing unit 31 includes a coin depositing port 313, a coin dispensing port 314, a bill depositing port 315, and a bill dispensing port 316. The coin depositing port 313 is a port where a customer deposits cash to the change machine 311 for cash payment. The coin dispensing port 314 is a port where change coins are dispensed from the change machine 311. The bill depositing port 315 is a port where a customer deposits bills to the change machine 311 for cash payment. The bill dispensing port 316 is a port where change bills are dispensed from the change machine 311.

The sales-data processing unit 32 includes various units, devices, and the like for execution of sales data processing related to commodities sales. In the present embodiment, the sales-data processing unit 32 includes a housing 321, a customer display 322, a handy scanner 323, and a rotary beacon light 324. The housing 321 supports the customer display 322 provided on an upper part thereof. The housing 321 accommodates a scanner 325 (FIG. 2) and a printer 326 (FIG. 2) therein.

The housing 321 includes a reading window 327 through which the scanner 325 reads a commodity code or the like of a commodity. The reading window 327 transmits laser light emitted by the scanner 325 to the outside of the housing 321 and transmits reflected light back into the housing 321. In some examples, the scanner 325 may capture an image of the commodity and read the commodity code or the like from the captured image. The housing 321 includes an issue port 328 for discharging a receipt or the like output by the printer 326. The printer 326 discharges, from the issue port 328, a receipt obtained by printing settlement information related to a commodity subjected to settlement processing on a piece of paper. The settlement information printed on the receipt includes, for example, a commodity name, a unit price of a commodity, and a total amount due in the transaction.

The customer display 322 and the control unit 100 (FIG. 2) together function as an informing unit. The customer display 322 is, for example, a liquid crystal display. The customer display 322 displays settlement information such as commodity information of a registered commodity to a customer who is using the self-service POS terminal 1 for settlement processing. The customer display 322 also displays settlement method information indicating a settlement method that cannot be executed by the POS terminal 1 or a settlement method that can be executed by the POS terminal 1. The settlement method information may also be displayed for a customer not currently performing the settlement processing, such as a customer who is waiting in line for a register counter or in a checkout area.

The customer display 322 includes a touch panel that receives customer operation on the POS terminal 1. The touch panel detects a touched part on a display screen of the customer display 322 and determines that customer operation corresponding to a displayed element by the customer display 322 has been entered. Consequently, the touch panel determines that a key displayed by the customer display 322 has been operated and receives the operation of the key.

The handy scanner 323 is a hand-held scanner. The handy scanner 323 is used if it is difficult to hold a commodity to be purchased over the reading window 327. For example, if a commodity is heavy or large, a customer can use the handy scanner 323. The rotary beacon light 324 is a warning lamp for notifying a store clerk that, for example, abnormality has occurred in the POS terminal 1. The rotary beacon light 324 flashes, for example, in red or the like when abnormality occurs in the POS terminal 1.

The first loading table 4 is a table for placing a basket including commodities that the customer is about to purchase. The second placing table 5 is a table for placing a commodity that the customer registers by reading a commodity code thereof with the scanner 325 or the handy scanner 323. The second loading table 5 includes a pair of bag hanging hooks 51 for hanging a bag in which the registered commodities are put and a temporary placing table 52 for the registered commodities. Each of the first loading table 4 and the second loading table 5 includes a measuring unit (not separately depicted). For example, If the weight of the commodities placed on the first loading table 4 before commodity codes thereof are read by scanning coincides with the weight of the commodities placed on the second loading table 5 after the reading of the commodity codes, the POS terminal 1 determines that all the commodities to be purchased by the customer are set or registered as targets of settlement processing.

The settlement terminal 2 is disposed on an upper part of the main body unit 3 in the present embodiment. The settlement terminal 2 executes reading and writing of information used for credit card settlement or electronic money card settlement. Such information is stored in a card storage medium (not separately depicted). The settlement terminal 2 includes a card insertion port 22 into which a credit card is inserted. The card insertion port 22 is provided on a front surface of the settlement terminal 2 in the present embodiment. The settlement terminal 2 includes a contactless reader/writer. The reader/writer accesses a noncontact-type electronic money card by a short-range wireless communication technology such as Near Field Communication (NFC). The electronic money card electronically stores money information. The reader/writer executes reading and writing of information that indicates a money amount stored in the card. The settlement terminal 2 is capable of communicating with a server of a credit card company and a server of an electronic money management company. The settlement terminal 2 includes a terminal sensor (not separately depicted) that detects a communication state with these servers. If a failure is detected in a communication state with the server of the credit card company, the terminal sensor outputs a detection signal B (FIG. 3). If a failure is detected in a communication state with the server of the electronic money card management company, the terminal sensor outputs a detection signal C (FIG. 3).

Figure 2:
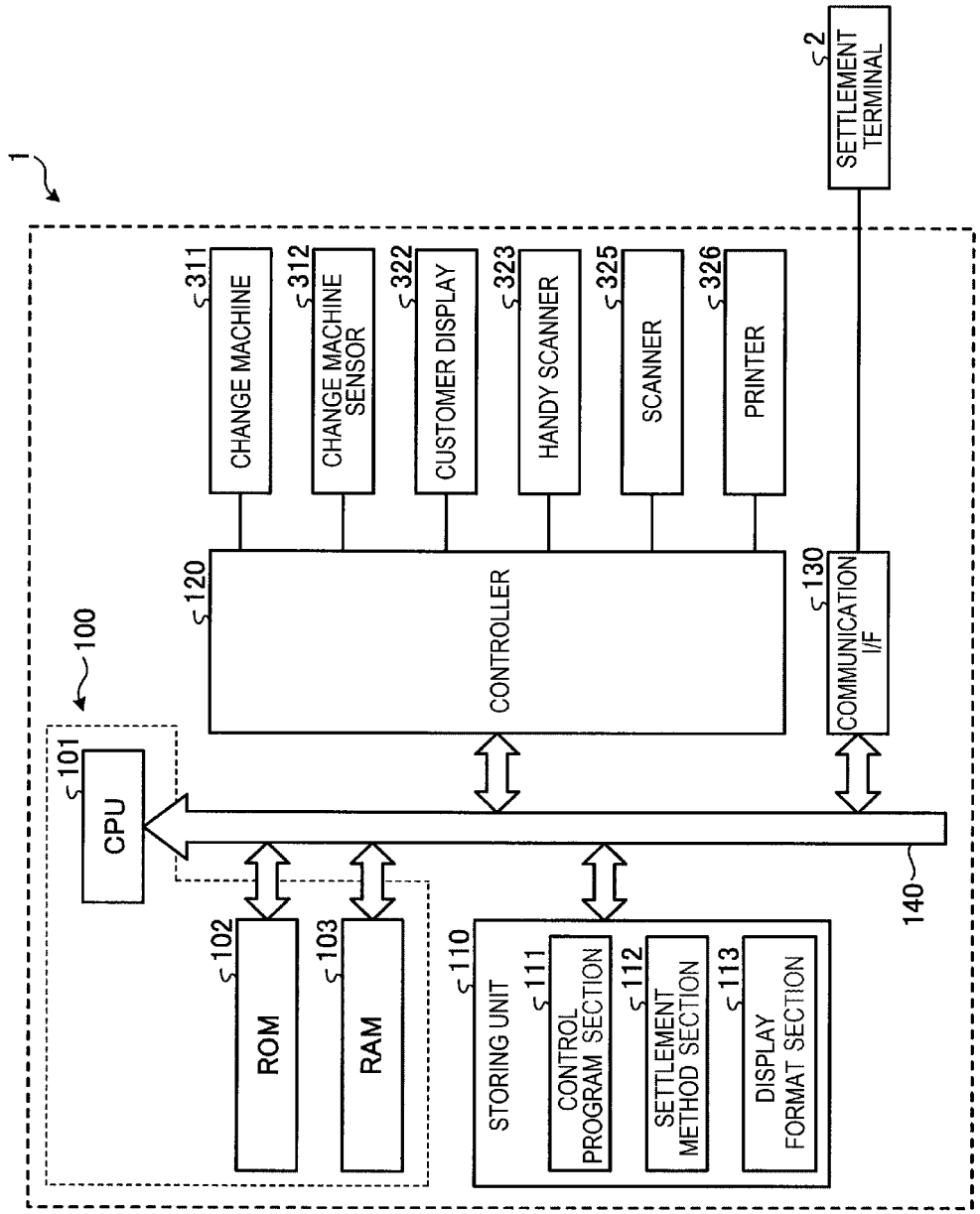
FIG. 2 is a block diagram of an example configuration of a POS terminal according to a first embodiment.

FIG. 2 is a block diagram of an example configuration of the POS terminal 1. The POS terminal 1 includes a control unit 100, a storing unit 110, a controller 120, and a communication Interface (I/F) 130. The control unit 100, the storing unit 110, the controller 120, and the communication I/F 130 are connected to one another via a bus 140.

The control unit 100 includes a Central Processing Unit (CPU) 101, a Read Only Memory (ROM) 102, and a Random. Access Memory (RAM) 103. The CPU 101, the ROM 102, and the RAM 103 are connected to one another via the bus 140. The CPU 101 controls the entire POS terminal 1. The ROM 102 stores various programs, such as a program used for driving the CPU 101, and various data. The RAM 103 is used as a work area of the CPU 101 and loads various programs and various data stored in the ROM 102 and the storing unit 110. The CPU 101 operates according to a control program stored in the ROM 102 or the storing unit 110 and loaded in the RAM 103, whereby the control unit 100 executes various kinds of control processing for the POS terminal 1.

The storing unit 110 includes, for example, a Hard Disk Drive (HDD). The storing unit 110 includes a control program section 111, a settlement method section 112, and a display format section 113. The control program section 111 is an area for storing various control programs. The settlement method section 112 is an area for storing a file describing a settlement method. As illustrated in FIG. 3, the settlement method file stores types of detection signals and settlement methods in association with each other. The detection signals are transmitted from the change machine sensor 312 or a terminal sensor, which detects states of various devices, machines, and the like (herein collectively referred to as a device or devices) of the settlement apparatus used in various kinds of settlement processing by a plurality of settlement methods.

As illustrated in FIG. 4, the display format section 113 stores a failure status and a display format in association with each other. The failure status indicates presence or absence of a failure that may occur in each of the devices used in the settlement processing and that might disable or otherwise prevent the POS terminal or the settlement apparatus from executing the settlement processing. The display format is used by the customer display 322 that displays various information during the settlement processing.

FIG. 5 depicts an example display screen of the customer display 322 of a first format (herein may also be referred to as a first screen). The first screen is displayed when a detection signal is absent, that is, when a failure has not occurred in any of the devices used in the settlement processing. The first screen includes a first settlement information region X. In the first settlement information region X, information related to content of the settlement processing, such as information of commodities registered by the customer, a total amount, and the like, is displayed.

FIG. 6 depicts an example display screen of the customer display 322 by a second format (herein may also be referred to as a second screen). The second screen is displayed when a detection signal is present, that is, when a failure has occurred in any one of the devices used in the settlement processing. The second screen includes a second settlement information region Y and a settlement method information region Z. Content displayed in the second settlement information region Y is the same as that displayed in the first settlement information region X. A size of the second settlement information region Y is smaller than that of the first settlement information region X. Characters displayed in the second settlement information region Y are smaller than those displayed in the first settlement information region X. Settlement method information is displayed in the settlement method information region Z. For example, in the settlement method information region Z, a settlement method incapable of executing the settlement processing is displayed (for example, "CASH SETTLEMENT NOT ALLOWED" as shown in FIG. 5) if a detecting unit 1001 (FIG. 7) detects a failure in any one of the devices used in the settlement processing according to that settlement method. A settlement method capable of executing the settlement processing may also be displayed in the settlement method information region Z.

Accordingly, the customer display 322 displays, in addition to the settlement information in the region Y, the settlement method information in the region Z if the detecting unit 1001 detects the settlement method incapable of executing the settlement processing. In such a case when the settlement method information and the settlement information are displayed at the same time, the customer display 322 may display the settlement information small compared with a case during non-display of the settlement method information, that is a case when the settlement method information is not displayed together with the settlement information (see, for example, FIGS. 5 and 6).

In another instance, if a failure or a problem is detected in any one of the devices even when the settlement processing is not being performed (for example, when the POS terminal 1 is not being used), the customer display 322 may display the settlement method information region Z in an enlarged format (for example, over the entire surface of the customer display 322) and displays the settlement method information indicating the unallowed settlement method in large characters.

Referring back to FIG. 2, the controller 120 is connected to the change machine 311, the change machine sensor 312, the customer display 322, the handy scanner 323, the scanner 325, and the printer 326. The control unit 100 transmits and receives data to and from the change machine 311, the change machine sensor 312, the customer display 322, the handy scanner 323, the scanner 325, and the printer 326. The communication I/F 130 is connected to the settlement terminal 2. The control unit 100 transmits and receives data to and from the settlement terminal 2.

Figure 7:
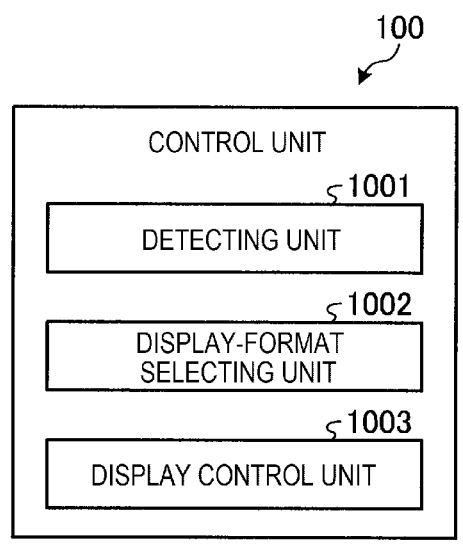
FIG. 7 is a block diagram of an example configuration of a POS terminal according to a first embodiment.

FIG. 7 is a block diagram of an example configuration of the control unit 100 of the POS terminal 1. The CPU 101 of the control unit 100 (FIG. 2) executes a control program stored in the ROM 102 or the storing unit 110, and the control unit 100 functions as a detecting unit 1001, a display-format selecting unit 1002, and a display control unit 1003. In some instance, part or all of the functions or functional components may be realized by hardware so long as the POS terminal 1 can perform the functions to achieve a desired effect.

The detecting unit 1001 detects the settlement method incapable of executing the settlement processing based on states of the devices used in the settlement processing. For example, the detecting unit 1001 receives detection signals from the change machine sensor 312 or the terminal sensor and refers to the settlement method file stored in the settlement method section 112 of the storing unit 110 (FIGS. 2 and 3) to determine the settlement method incapable of executing the settlement processing. For example, upon receipt of the detection signal A from the change machine sensor 312, indicating an abnormality of the cash conveying mechanism or a change shortage, the detecting unit 1001 determines that cash settlement cannot be executed. Upon receipt of the detection signal B from the terminal sensor, indicating a communication failure with a server of a credit company or the like, the detecting unit 1001 determines that credit settlement cannot be executed. Upon receipt of the detection signal C from the terminal sensor, indicating a communication failure with a server of an electronic money management company or the like, the detecting unit 1001 determines that electronic money settlement cannot be executed. The detecting unit 1001 may also determine that any type of settlement method is impossible for settlement processing based on a detection signal from the touch panel of the customer display 322 or the like. For instance, if a credit card or an electronic money card cannot be read, a reading error button can be displayed on the customer display 322, whereby the detecting unit 1001 receives the corresponding detection signal.

If the settlement processing is being performed at the POS terminal 1, the display-format selecting unit 1002 selects a display format of the customer display 322 based on whether the detecting unit 1001 has received the detection signal. For example, the display-format selecting unit 1002 selects the first format referring to the display format file stored in the display format section 113 of the storing unit 110 (FIGS. 2 and 4) if a failure has not occurred in any of the devices used in the settlement processing. The display-format selecting unit 1002 selects the second format from the stored display format file if a failure has occurred in any one of the devices used in the settlement processing.

The display control unit 1003 controls the customer display 322 based on a result of the detection by the detecting unit 1001 and a result of the selection by the display format selecting unit 1002. The display control unit 1003 outputs settlement method information and a display instruction to the customer display 322. Therefore, the display control unit 1003 also functions as an output unit that outputs the settlement method information. The display control unit 1003 and the customer display 322 together functions as an informing unit. During the settlement processing, the display control unit 1003 causes the customer display 322 to perform information display in the display formats as shown in FIG. 5 and FIG. 6. In a case where the settlement processing is not being performed and a failure has neither occurred nor detected in any of the devices, the display control unit 1003 may cause the customer display 322 to display an advertisement or the like. In a case where the settlement processing is not being performed but a failure, a problem, or the like has detected in any one of the devices, the display control unit 1003 causes the customer display 322 to display the settlement method information region Z in an enlarged format, such as the largest format compared with the other regions, and display the unallowable settlement method incapable of executing the settlement processing. The display control unit 1003 may also cause the customer display 322 to display the allowable settlement method capable of executing the settlement processing in addition to, or in place of, the unallowable settlement method. In another instance, the display control unit 1003 may cause the customer display 322 to display only the settlement method information region Z. This enables the settlement method information to be displayed in a format enlarged as much as possible so that a greater number of customers in a wider range around the POS terminal 1 can notice the settlement method information indicating either or both of the unallowable and allowable settlement methods before the customers use the POS terminal 1.

Figure 8:
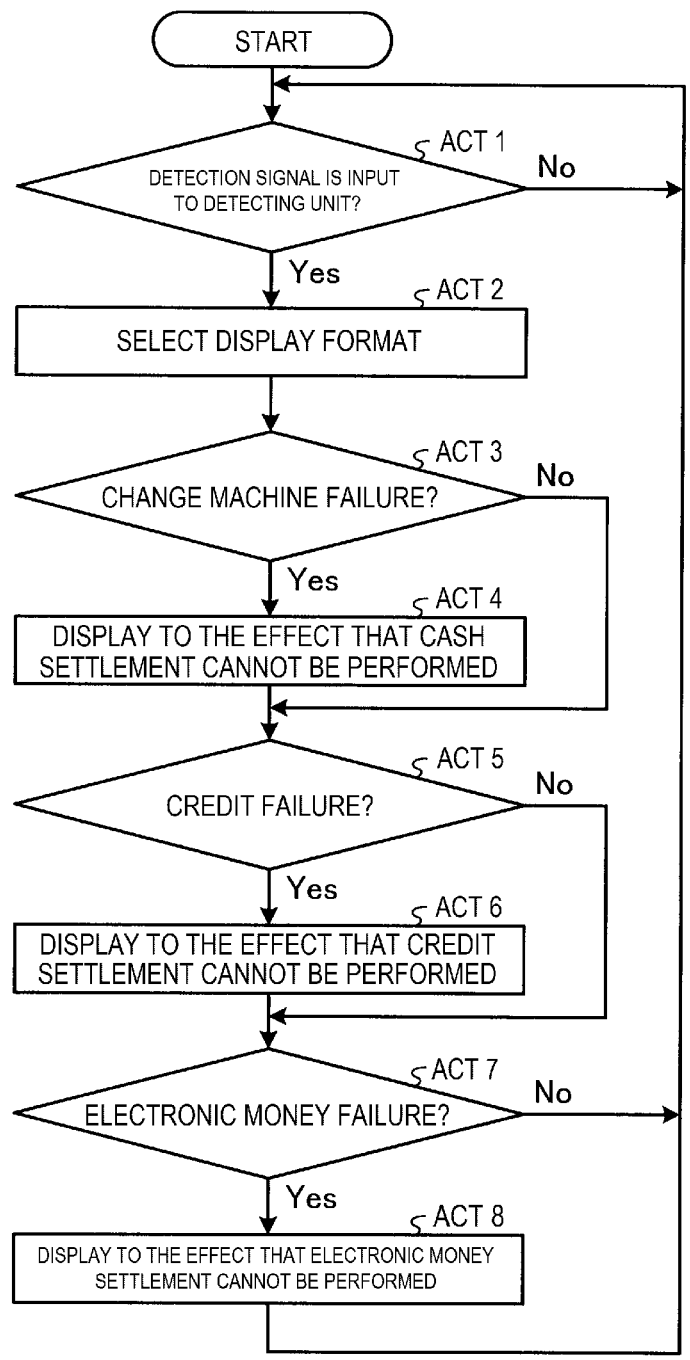
FIG. 8 is a flowchart of processing by a control unit according to a first embodiment.

FIG. 8 is a flowchart of an example processing of settlement method information display by the control unit 100 of the POS terminal 1. This processing is executed in the background of the settlement processing in the present embodiment.

The control unit 100 determines whether a detection signal is input to the detecting unit 1001 (ACT 1). If a detection signal is not input (No in ACT 1), the control unit 100 returns to the processing in ACT 1 and stays on standby. If a detection signal is input to the detecting unit 1001 (Yes in ACT 1), the display-format selecting unit 1002 selects the second display format stored in the display format section 113 of the storing unit 110 (ACT 2).

Subsequently, the control unit 100 determines whether the detection signal received by the detecting unit 1001 is the detection signal A indicating a failure of the change machine 311 (ACT 3) that prevents the POS terminal 1 or the settlement apparatus from executing the cash settlement processing. In other words, the control unit 100 determines whether the detecting unit 1001 has detected that the cash settlement cannot be executed. If the detection signal indicates the failure of the change machine 311 (Yes in ACT 3), the display control unit 1003 causes the customer display 322 to display that the cash settlement cannot be executed, by using the second display format in the settlement method information region Z (ACT 4). If the detection signal does not indicate a failure of the change machine 311 (No in ACT 3), the control unit 100 skips the processing in ACT 4 and moves to the processing in ACT 5.

The control unit 100 also determines whether the detection signal received by the detecting unit 1001 is the detection signal B indicating a failure in the credit settlement (ACT 5) that disables the POS terminal or the settlement apparatus from executing the credit card settlement processing. In other words, the control unit 100 determines whether the detecting unit 1001 has detected that the credit settlement cannot be executed. If the detection signal indicates a failure in the credit settlement (Yes in ACT 5), the display control unit 1003 causes the customer display 322 to display that the credit settlement cannot be executed, by using the second display format in the settlement method information region Z (ACT 6). If the detection signal does not indicate a failure in the credit settlement (No in ACT 5), the control unit 100 skips the processing in ACT 6 and moves to the processing in ACT 7.

The control unit 100 further determines whether the detection signal received by the detecting unit 1001 is the detection signal C indicating a failure in the electronic money settlement (ACT 7) that disables the POS terminal 1 or the settlement apparatus from executing the electronic money settlement processing. In other words, the control unit 100 determines whether the detecting unit 1001 detects that the electronic money settlement cannot be executed. If the detection signal indicates a failure in the electronic money settlement (Yes in ACT 7), the display control unit 1003 causes the customer display 322 to display that the electronic money settlement cannot be executed, using the second display format in the settlement method information region Z (ACT 8). The control unit 100 then returns to the processing in ACT 1. If the detection signal does not indicate a failure in the electronic money settlement (No in ACT 7), the control unit 100 skips the processing in ACT 8 and returns to the processing in ACT 1. In a case where a failure occurs in any one of the devices during the settlement processing and the settlement cannot be completed, the customer may operate the customer display 322 such as the touch panel to turn on the rotary beacon light 324 and call a store clerk. The customer can then separately complete the settlement according to an instruction of the store clerk.

According to the processing of settlement method information display in the present first embodiment, the customer display 322 displays the settlement method information indicating an un-executable settlement method among a plurality of settlement methods appliable in the POS terminal 1. The customer display 322 of the POS terminal 1 enables a customer to see the displayed information before the customer starts to operate the POS terminal 1 for settlement processing. Therefore, a customer becomes aware of which settlement method can be used or cannot be used in advance.

After the settlement processing is complete, the customer display 322 may display an advertisement or the like on the condition that there is still no failure or problem detected. Once a failure has been detected, the customer display 322 may start displaying the settlement method information region Z enlarged to the maximum extent possible and shows a settlement method incapable of executing the settlement processing in a large format in the enlarged region Z.

With the self-service POS terminal 1 in the first embodiment, based on a result of the detection by the detecting unit 1001, the settlement method incapable of executing the settlement processing can be effectively informed to a customer. Accordingly, a customer can easily recognize the settlement method which cannot be used for the settlement processing. This improves convenience for a customer in executing settlement processing at the self-service POS terminal 1.

With the self-service POS terminal 1 in the first embodiment, the settlement method incapable of executing the settlement processing is displayed using the customer display 322. Accordingly, it is unnecessary to provide a separate informing apparatus such as a new display in order to inform the customer of the unallowed settlement method. This avoids the POS terminal 1 from having an extra component or a complicated configuration. Further, in one instance when the customer display 322 displays both the settlement method information and the settlement information such as commodity information at the same time, the settlement information is displayed small compared with a case when the settlement method information is not displayed. This makes it easier to view the settlement method information and the settlement information when being displayed at the same time on the customer display 322. In another instance, if the POS terminal 1 is not performing the settlement processing, the display control unit 1003 may display the settlement method information large. Therefore, it is possible to let a greater number of customers in a wider range around the POS terminal know the settlement method information indicating either or both of the unallowed and allowed settlement methods before the customers use the POS terminal 1.

Second Embodiment

Figures 9, 10:
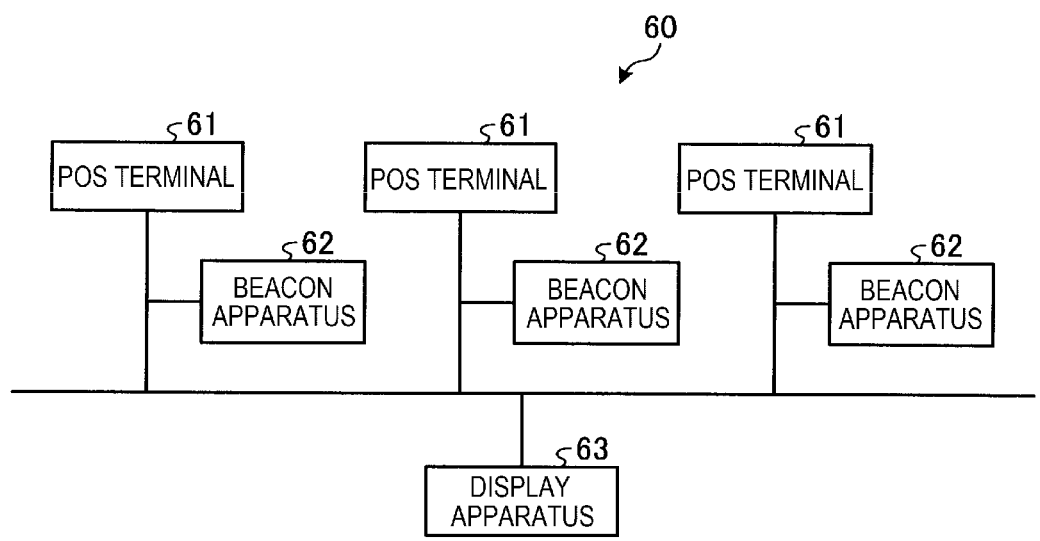
FIG. 9 depicts a settlement method informing system according to a second embodiment.
FIG. 10 depicts an example display screen of a display apparatus according to a second embodiment.

A second embodiment will be explained with reference to FIGS. 9 to 11. In the second embodiment, settlement method information is informed by an external apparatus rather than a POS terminal. The same components as those in the first embodiment are denoted by the same reference numerals and signs and detailed explanation thereof is omitted. FIG. 9 is a block diagram illustrating an example configuration of a settlement method informing system in the second embodiment. A settlement method informing system 60 includes a plurality of POS terminals 61, a plurality of beacon apparatuses 62, and a display apparatus 63. The POS terminals 61, the beacon apparatuses 62, and the display apparatus 63 are connected to one another via a network.

The POS terminals 61 are respectively provided in a plurality of register counters or checkout counters in a store and are operated by store clerks. The POS terminal 61 is an example of a settlement apparatus. In the store, a line region where customers stand in a line to make settlement or payment of commodities is arranged for each of the counters.

The beacon apparatuses 62 are provided corresponding to the respective POS terminals 61. Each beacon apparatus 62 outputs a signal (herein may also be referred to as a beacon signal) by, for example, Bluetooth (registered trademark). The beacon apparatus 62 is provided in each of the line regions. The beacon apparatus 62 outputs the beacon signal to the line region and performs wireless communication with portable terminals, such as smartphones, of customers standing in the line region. When the beacon apparatus 62 outputs the beacon signal including the settlement method information, each of the customers' portable terminals receives the beacon signal. The customers can obtain the settlement method information via the portable terminals while waiting in the line region. Therefore, the beacon apparatus 62 functions as an informing apparatus that informs the customers of the settlement method information.

The display apparatus 63 is provided at a position where customers who are waiting in the line region can easily view the display apparatus 63. For example, the display apparatus 63 is provided at an elevated position above the register counters so that it can be easily noticed and viewed by the customers waiting in line other than those who are currently making payment of commodities with the POS terminal 61 operated by the store clerks at the respective counters.

FIG. 10 depicts an example display screen of the display apparatus 63. The display apparatus 63 displays, based on outputs from the POS terminals 61, a register number of each of the POS terminal 61 and a settlement method that can be used at each of the POS terminals 61 specified by the register number. Therefore, the display apparatus 63 also functions as the informing apparatus that informs the customers of the settlement method information.

Figure 11:
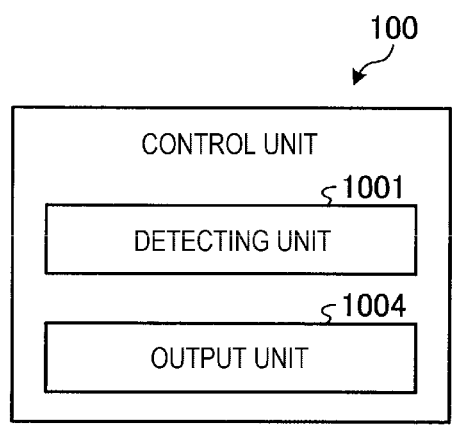
FIG. 11 is a block diagram of an example configuration of a POS terminal according to a second embodiment.

FIG. 11 is a block diagram of an example configuration of the control unit 100 of the POS terminal 61. Like the control unit 100 in the first embodiment, the CPU 101 executes the control program stored in the ROM 102 or the storing unit 110, whereby the control unit 100 functions as the detecting unit 1001 and an output unit 1004. In some instance, part or all of the functions or functional components may be realized by hardware so long as the POS terminal 61 can perform the functions to achieve a desired effect.

The detecting unit 1001 is the same or substantially the same as the detecting unit 1001 in the first embodiment. Therefore, detailed explanation of the detecting unit 1001 is omitted here.

The output unit 1004 outputs, based on a result of the detection by the detecting unit 1001, settlement method information indicating a settlement method incapable of executing the settlement processing or a settlement method capable of executing the settlement processing to the informing apparatus, which convey the settlement method information to customers. For example, if the detecting unit 1001 detects the unallowed settlement method that is incapable of executing the settlement processing due to some failure or malfunction in the POS terminal 61 or in communication with the server of the credit company or the electronic money management company, the output unit 1004 outputs the settlement method information to the beacon apparatuses 62 and the display apparatus 63.

If the detecting unit 1001 does not detect any unallowed settlement method, that is if a failure has not occurred or has not been detected in the various devices used in the settlement processing in any of the POS terminals 61, the output unit 1004 does not output anything. In this case, the beacon apparatus 62 does not output a beacon signal. The display apparatus 63 displays cash, credit, and electronic money as the settlement methods that can be used in all of the POS terminals 61 specified by the corresponding register numbers (FIG. 10). Consequently, customers can learn that the settlement processing can be performed by any of the available settlement methods in all POS terminals 61.

Once a failure has occurred in any one of the devices used for the settlement processing, the detecting unit 1001 detects the settlement method incapable of executing the settlement processing. The output unit 1004 outputs the settlement method information corresponding to a result of the detection by the detecting unit 1001. For example, when a failure occurs in the conveying mechanism of the change machine 311 included in the POS terminal 61 with a register number 3 (FIG. 10), the detecting unit 1001 of that specific POS terminal 61 detects that the cash settlement cannot be executed. The output unit 1004 then outputs the settlement method information indicating that the cash settlement cannot be executed to the beacon apparatus 62 and the display apparatus 63 of the POS terminal 61 of the register number 3.

The beacon apparatus 62, which has received the settlement method information from the output unit 1004, sends out a beacon signal including the received settlement method information. Portable terminals of customers, who are waiting in the line region corresponding to the POS terminal 61 of the register number 3, receives the beacon signal. Consequently, the customers become aware that the cash settlement is not available in the POS terminal 61 of the register number 3. The customers who wish to use the cash settlement can then move to another line region for another POS terminal 61 where the cash settlement is available.

At the same time, the display apparatus 63, which has received the settlement method information from the output unit 1004, display such information by, for example, deleting the cash settlement from the list of processing methods capable of performing settlement at the POS terminal 61 of the register number 3. Consequently, the display apparatus 63 can let the customers waiting in line know that the cash settlement cannot be used in the POS terminal 61 of the register number 3. The display apparatus 63 may also be able to inform other customers who are shopping or the like know of the update on the unavailable or available settlement methods. Therefore, the customers who wish to use the cash settlement do not have to stand in the line region corresponding to the POS terminal 61 of the register number 3. This prevents or reduces a waiting time for customers. The entire operation at the POS terminals 61 also becomes further efficient.

In the second embodiment, with the settlement method informing system 60 including the POS terminals 61 operated by store clerks at the respective register or checkout counters and the display apparatus 63 provided as the informing apparatus, for example, at an elevated position above the counter, the settlement method incapable of executing the settlement processing can be effectively informed to customers, based on the detection by the detecting unit 1001 of the POS terminals 61. Accordingly, a greater number of customers can easily recognize in advance the settlement method which cannot be used or can be used for the settlement processing at particular POS terminals 61. This improves convenience for customers and also for store clerks in executing settlement processing at the POS terminals 61 because the customers can decide which POS terminals 61 to wait for or which line regions to wait in depending on the available settlement methods beforehand.

Further, in the second embodiment, with the beacon apparatuses 62 of the settlement method informing system 60, the settlement method information is transmitted to portable terminals, portable devices, or the like of customers waiting in line at a cash register. Therefore, even if the customers do not look at the display apparatus 63, the settlement method information can be provided to those who wish to obtain such information in advance. This can be further effective in sharing the settlement method information with the customers in such a case where a great number of customers operate their own portable terminals while waiting in line for settlement processing.

Also, in the second embodiment, the display apparatus 63 can display information of all of the POS terminals 61 at once. Therefore, each of the POS terminals 61 does not require separate components for displaying the settlement method information specific thereto, and the entire configuration of the settlement method informing system 60 can be simplified.

In the second embodiment, both the beacon apparatuses 62 and the display apparatus 63 are provided as the informing apparatuses. In another embodiment, either the beacon apparatuses 62 or the display apparatus 63 may be provided as the informing apparatus.

In the present first and second embodiments, the POS terminal 1 or 61 that performs both the commodity registration and the settlement processing is one example of the settlement apparatus. However, the settlement apparatus is not limited to this. One example may be a settlement apparatus of a so-called semi-self-service POS system that does not perform the commodity registration and performs only the settlement processing. Another example may be an automatic ticket machine.

While the informing unit, such as the combination of the customer display 322 and the control unit 100, is capable of informing customers of the settlement method information by display in the present embodiments, the informing unit may be configured to inform the settlement method information with sound or the like in other embodiments.

Examples of the settlement methods that can be used in the settlement apparatus are not limited to the cash settlement, the credit settlement, and the electronic money settlement. Other settlement methods such as two-dimensional code settlement may be adopted as appropriate.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A settlement apparatus, comprising:
  a display device positioned to be visible to customers facing at least a front of the settlement apparatus;
  a change machine for receiving bills and coins as settlement of a sales transaction and returning change due for the sales transaction;
  a settlement terminal for credit card or electronic money card settlement of the sales transaction; and
  a processor configured to:
    detect states of the change machine and the settlement terminal for execution of settlement processing using a plurality of settlement methods;
    determine, based on the detected states, whether there is a first settlement method among the plurality of settlement methods that cannot be executed at the settlement apparatus; and
    output settlement method information to the display for informing a customer that the first settlement method cannot be executed at the settlement processing apparatus or that another settlement method in the plurality of settlement methods can be executed at the settlement processing apparatus instead of the first settlement method.

2. The settlement apparatus according to claim wherein the display is further configured to display settlement information indicating content of the settlement processing.

3. The settlement apparatus according to claim 2, wherein when the settlement method information and the settlement information are displayed at the same time, the settlement information is displayed smaller than compared with a case when the settlement method information is not displayed.

4. The settlement apparatus according to claim 2, wherein when the settlement information is not displayed, the settlement method information is displayed in an enlarged manner compared to when the settlement method information and the settlement information are displayed at the same time.

5. The settlement apparatus according to claim 1, wherein the processor is further configured to:
detect a failure of the change machine based on output from a sensor in the change machine.

6. The settlement apparatus according to claim 5, wherein the failure includes a malfunction of the change machine or a lack of one or more bill or coin denominations within the change machine.

7. A point-of-sale (POS) apparatus, comprising:
a display device positioned to be visible to customers facing at least a front of the POS apparatus;
a change machine for receiving bills and coins as settlement of a sales transaction and returning change due for the sales transaction;
a change machine sensor configured to detect states of the change machine;
a settlement terminal for credit card or electronic money card settlement of the sales transaction; and
a processor configured to:
detect states of the change machine and the settlement terminal settlement apparatus for execution of settlement processing by a plurality of settlement methods, the states being detected based on output signals from the change machine sensor and the settlement terminal;
determine, based on the detected states, whether there is a first settlement method among the plurality of settlement methods that cannot be executed at the settlement apparatus; and
output settlement method information to the display device for informing a customer that the first settlement method cannot be executed at the POS apparatus or that another settlement method in the plurality of settlement methods can be executed at the POS apparatus instead of the first settlement method.

8. The POS apparatus according to claim 7, wherein the processor is further configured to:
detect a failure of a communication with an external server that prevents execution of the first settlement method.

9. The POS apparatus according to claim 7, wherein the is display device includes a display screen.

10. The POS apparatus according to claim 7, wherein the processor is further configured to cause an informing device to send out a wireless communication signal indicating the settlement method information to a portable terminal of a customer.

11. A settlement method notification system for retail stores, the system comprising:
a notification apparatus;
a settlement apparatus connected to the notification apparatus and including:
a change machine for receiving bills and coins as settlement of a sales transaction and returning change due for the sales transaction;
a settlement terminal for credit card or electronic money card settlement of the sales transaction; and
a processor configured to:
detect states of the change machine and the settlement terminal for execution of settlement processing using a plurality of settlement methods;
determine, based on the detected states, whether there is a first settlement method among the plurality of settlement methods that cannot be executed at the settlement apparatus; and
output settlement method information to the informing apparatus, the settlement method information indicating the first settlement method cannot be executed at the settlement processing apparatus or that another settlement method in the plurality of settlement methods can be executed at the settlement processing apparatus instead of the first settlement method.

12. The settlement method notification system according to claim 11, wherein the processor of the settlement apparatus is further configured to:
detect a failure of a communication with an external server that prevents execution of the first settlement method.

13. The settlement method notification system according to claim 11, wherein the notification apparatus includes a display screen.

14. The settlement method notification system according to claim 11, wherein the processor of the settlement apparatus is further configured to cause the notification apparatus to send out a wireless communication signal indicating the settlement method information to a portable terminal of a customer.

* * * * *